Aug. 17, 1965  J. W. HAWKINS  3,200,616
SAFETY DEVICES

Filed March 8, 1963  2 Sheets-Sheet 1

INVENTOR.
John William Hawkins
BY
Stevens, Davis, Miller & Mosher
ATTORNEY

Aug. 17, 1965　　　　J. W. HAWKINS　　　　3,200,616
SAFETY DEVICES

Filed March 8, 1963　　　　　　　　　　2 Sheets-Sheet 2

INVENTOR
John William Hawkins
BY
Stevens, Davis, Miller & Mosher
ATTORNEYS

United States Patent Office 3,200,616
Patented Aug. 17, 1965

3,200,616
SAFETY DEVICES
John W. Hawkins, Sunbury-on-Thames, Middlesex, England, assignor to Power Jets (Research & Development) Limited, London, England, a British company
Filed Mar. 8, 1963, Ser. No. 263,937
Claims priority, application Great Britain, Mar. 23, 1962, 11,220/62
3 Claims. (Cl. 64—28)

The present invention relates to safety devices.

In certain forms of rotary machine, notably gas turbine plant, the sudden removal of the load on a machine can have serious consequences unless steps are taken to shut off fuel supply or other power input to the machine immediately.

It is accordingly an object of the present invention to provide a safety device which will set up a rapid control action on the occurrence of machine operating conditions liable to cause damage to the machine.

Several embodiments of torque-transmission elements in accordance with the invention will now be described, by way of example, with reference to the accompanying diagrammatic drawings, in which.

Figure 1:
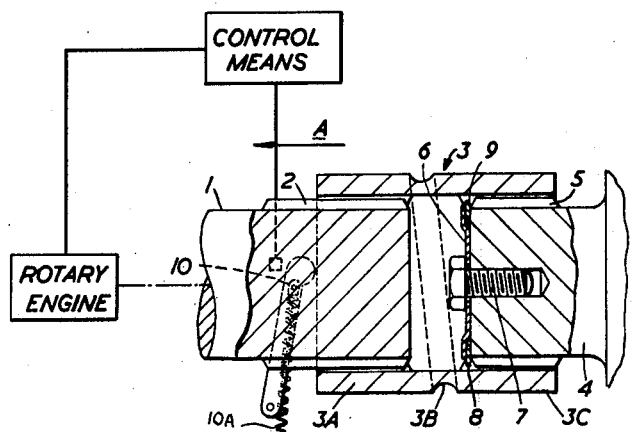
FIGURE 1 shows a longitudinal-section of one form of the torque-transmission element before fracture.
Figure 2:
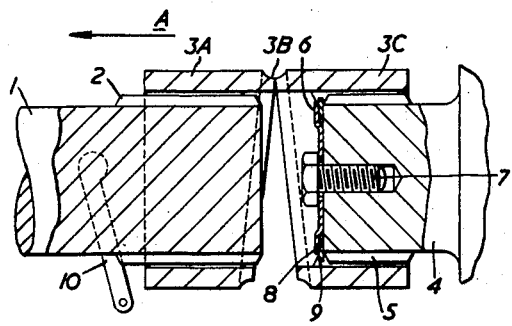
FIGURE 2 shows a longitudinal-section of the torque-transmission element shown in FIGURE 1 after fracture.

In FIGURES 1 and 2, a power output shaft 1 of a rotary machine, carries around its periphery a pluarlity of axially extending splines 2 which engage correspondingly splines carried on the radially inner surface of a part 3A of a sleeve form of torque-transmission element 3. A weakened zone in the form of a neck 3B extends around the radially outer surface of the element 3 and lies about a plane inclined to the longitudinal axis of the element.

A driven shaft 4 carries around its periphery a plurality of axially extending splines 5 which engage corresponding splines on the radially inner surface of a part 3C of the element 3. A circular plate 6 is secured to the driven shaft 4 by a set-bolt 7, the plate 6 being provided to hold an internal circlip 8 in grooves 9 formed in the splines on the radially inner surface of the part 3C of the element 3. The part 3C is therefore locked at all times against axial movement along the driven shaft 4. A trip lever 10 which trips with a toggle action is positioned close to the part 3A and is connected to control means which is operable to shut off the fuel supply to the rotary machine. The position of the trip lever 10 is influenced by a spring 10A secured at one end to a base member and at its other end to the lever 10. The trip lever 10 is shown in its untripped position in FIGURE 1, and in its tripped position in FIGURE 2.

During normal operation, the power output shaft 1 transmits drive to the driven shaft 4 through the torque-transmission element 3. If, however, the driven shaft 4 is suddenly overloaded, the splines 5 of the driven shaft tend to lock the part 3C of the element 3 against continued rotation and the internal circlip 8 will prevent any axial movement of the part 3C along the shaft 4. The element will therefore fracture about the inclined neck 3B. As the shaft 1 continues to rotate, the part 3A will be moved axially along the shaft 1 in the direction of arrow A owing to the resulting reaction between the adjacent cam-like end surfaces of the parts 3A and 3C. As the part 3A is moved along the shaft 1, it makes contact with the trip lever 10 which trips under the influence of the spring 10A to a position in which the control means operates to shut off the fuel supply to the rotary machine.

The neck 3B of the element 3, is of elliptical form, but any convenient form may be used which, upon the neck shearing, provides for a cam-like reaction between the adjacent surfaces of the torque-transmission element.

Although the control device operable to shut off the fuel supply to the rotary machine has been illustrated as being operable by the spring influenced trip lever 10, any suitable control means may be used.

The trip lever 10 may be mounted on the bearing housing which provides axial location of one of the shafts 1, 4.

Figure 3:
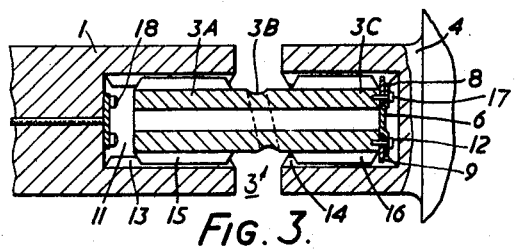
FIGURE 3 shows a longitudinal-section of a further torque-transmission element before fracture.

In an alternative embodiment illustrated in FIGURE 3, the torque-transmission element 3 is of cylindrical form. The parts 3A and 3C of the element 3 extend into bores 11 and 12 formed in adjacent ends of the driving shaft 1 and the driven shaft 4 respectively. The bores 11 and 12 each have a plurality of axially extending splines 13 and 14 which engage co-operating splines 15 and 16 carried around the outer surface of the parts 3A and 3C of the torque-transmission element. The circular plate 6 is secured to the end of the part 3C of the torque-transmission element by a ring of set screws 17, the plate 6 being provided to hold the internal circlip 8 in grooves 9 formed in the splines 16 arranged in the bore 12 of the driven shaft 4. The part 3C of the element 3 is therefore locked at all times against axial movement in the driven shaft 4. The neck 3B extends around the surface of the torque-transmission element 3 and lies in a plane inclined to the longitudinal axis of the element. A pair of electrical contacts 18 are positioned in the bore 11 of the driving shaft 1 and are interconnected with a control device as shown in FIGURES 1 and 2 operable to shut off the fuel supply to the rotary machine.

The operation of the embodiment illustrated in FIGURE 3 is substantially the same as that described with reference to FIGURES 1 and 2. Upon a sudden overloading of one of the shafts 1, 4, the torque-transmission element 3 will fracture about the inclined neck 3B, and the part 3A of the element 3 extending in the bore 11 of the driving shaft 1 will be moved axially along the bore 11 owing to the resulting reaction between the adjacent cam-like surfaces of the parts 3A and 3C. As the part 3A is projected along the bore 11, it makes contact with the contacts 18 which operate electrically to shut off the fuel supply to the machine.

In FIGURES 4 to 7 of the drawings, the torque-transmission element 3 forms one end of the shaft 1. The element 3 again has a weakened zone in the form of a groove 3B, and has a part 3C which extends into a bore 20 in one end of a rotary driven member 21. The part 3C carries around its radially outer surface a plurality of splines 22 which engage co-operating splines 23 arranged in the bore 20.

A lever 24 is pivotally connected to the driven member 21 by a pin 25 but is restrained from pivotal movement during normal running of the machine by an extension 26 of the lever resting on one of the splines 22A. A control system operable to shut down the machine includes a spindle 27 having an arm 28 which upon movement in a direction indicated by the arrow 30 (FIGURES 6 and 7), effects operation of the control system.

Figure 4:
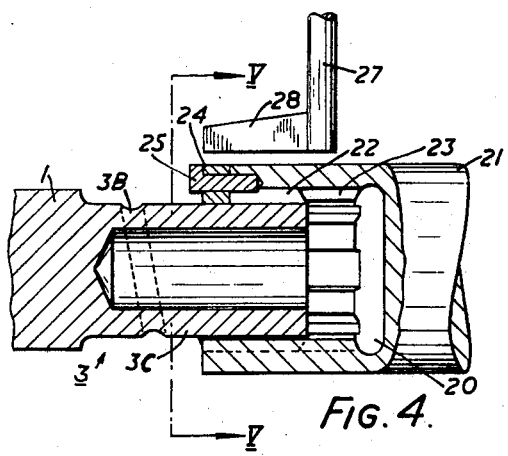
FIGURE 4 shows a longitudinal-section of a still further torque-transmission element before fracture.
Figure 5:
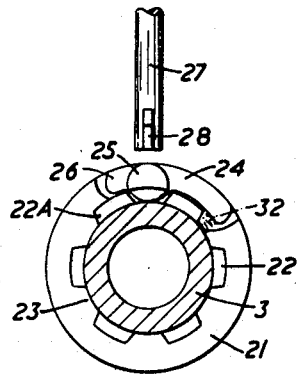
FIGURE 5 is a cross-section taken along the line V—V of FIGURE 4.
Figure 6:
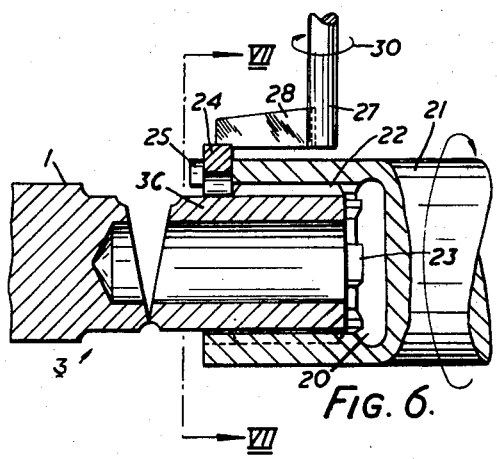
FIGURE 6 shows a longitudinal-section taken along the line VI—VI of FIGURE 7 of the torque-transmission element illustrated in FIGURE 4 after fracture.

During normal operation of the machine, the shaft 1 transmits drive through the torque-transmission element 3 and splines 22, 23 to the driven member 21, and the lever 24 and spindle 27 are in the positions shown in FIGURES 4 and 5. However, upon the occurrence of a predetermined overload torque, the torque-transmission element fractures about the neck 3B and the part 3C is moved axially along the bore 20. As the part 3C is moved along the bore 20, the extension 26 is freed from the restraining influence of the spline 22A and, owing to centrifugal force, the lever 24 moves to the position indicated in FIGURES 6 and 7 so that, upon continued rotation of the member 21 in the direction of arrow 31, the lever strikes the arm 28 of the spindle to effect operation of the control means of the machine.

Figure 7:
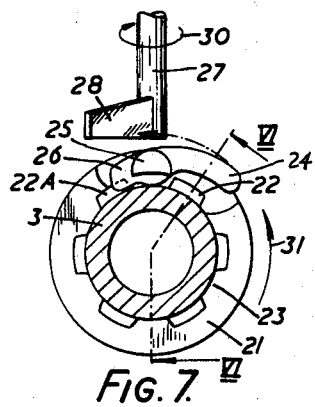
FIGURE 7 is a cross-section taken along the line VII—VII of FIGURE 6.

A spring 32, shown in broken line in FIGURE 5, may be provided to move the lever to the position shown in FIGURE 7 should centrifugal force not be sufficient.

In each of the embodiments, the torque-transmission element is arranged to be more highly stressed than the members to which it is coupled, and the weakened zone of the torque-transmission element is arranged to fracture at a predetermined overload torque. The weakened zone may be arranged to fracture due to a gradual overloading or to a sudden overloading of one of the members, and may lie in a plane which subtends an angle of between 65° and 80° to the longitudinal axis of the torque-transmission element.

What I claim is:

1. A safety device for a rotary machine, which safety device includes a torque-transmission element and a control means operated by said torque-transmission element to prevent damage to the rotary machine, the torque-transmission element including two portions joined by a weakened zone, said weakened zone being positively defined and lying about a plane inclined to the longitudinal axis of the element whereby on the occurrence of a predetermined overload torque said element is adapted to fracture along said weakened zone forming two parts, the weakened zone defining a cam-like surface at each adjacent end of the said two parts, said cam-like surfaces co-operating on fracture of the weakened zone, axial movement of one of said parts resulting from relative rotation of the cam-like surfaces serving to initiate operation of said control means, and means to support the other said part from axial displacement upon fracture of said element.

2. A safety device for a rotary machine, which rotary machine includes a driving member, a driven member coupled to the driving member, a plurality of splines formed around the peripheries of the driving and driven members, the safety device including a torque-transmission sleeve serving to couple the driving and driven members together and a control means operated by said torque-transmission sleeve to prevent damage to the rotary machine, the torque-transmission sleeve including two portions joined by a weakened zone, said weakened zone being positively defined and lying about a plane inclined to the longitudinal axis of the sleeve whereby on the occurrence of a predetermined overload torque the sleeve is adapted to fracture along said weakened zone forming two parts, the weakened zone defining a cam-like surface at each adjacent end of the said two parts, said cam-like surfaces co-operating on fracture of the weakened zone, axial movement of one of said parts resulting from relative rotation of the cam-like surfaces serving to initiate operation of said control means, a plurality of splines formed around the radially inner periphery of each of the said parts of the torque-transmission sleeve, which splines co-operate with the said splines of the driving and driven members, means to prevent rotation of the torque-transmission sleeve relative to one of the said members, and means to support the other said part from axial displacement upon fracture of said element.

3. A safety device for a rotary machine, which rotary machine includes a driving member, a driven member coupled to the driving member, a bore formed in the adjacent ends of the driving and driven members, a plurality of splines formed around the peripheries of the bores, the safety device including a torque-transmission element serving to couple the driving and driven members together and a control means operated by said torque-transmission element to prevent damage to the rotary machine, the torque-transmission element including two portions joined by a weakened zone, said weakened zone being positively defined and lying about a plane inclined to the longitudinal axis of the element whereby on the occurrence of a predetermined overload torque the sleeve is adapted to fracture along said weakened zone forming two parts, the weakened zone defining a cam-like surface at each adjacent end of said two parts, said cam-like surfaces co-operating on fracture of the weakened zone, axial movement of one of said parts resulting from relative rotation of the cam-like surfaces serving to initiate operation of said control means, a plurality of splines formed around the peripheries of the said parts of the element, which splines co-operate with the said splines formed in the bores of the driving and driven members, means to prevent rotation of the torque-transmission element relative to one of the said members, and means to support the other said part from axial displacement upon fracture of said element.

References Cited by the Examiner
UNITED STATES PATENTS

| | | | |
|---|---|---|---|
| 724,684 | 4/03 | Edwards | 64—28 |
| 2,022,007 | 11/35 | Moore | 64—28 |
| 2,628,337 | 2/53 | Getz | 64—28 XR |
| 2,773,369 | 12/56 | Klemm | 64—28 |

FOREIGN PATENTS

| | | |
|---|---|---|
| 574,233 | 4/59 | Canada. |
| 255,556 | 1/13 | Germany. |

ROBERT C. RIORDON, *Primary Examiner.*